(12) United States Patent
Patton et al.

(10) Patent No.: US 9,200,501 B2
(45) Date of Patent: Dec. 1, 2015

(54) VALVE ASSEMBLY

(71) Applicant: Petrowell Limited, Aberdeen (GB)

(72) Inventors: Damien Gerard Patton, Kennethmont (GB); Davidson Harman, Aberdeen (GB)

(73) Assignee: Petrowell Limited, Aberdeen (GB)

( * ) Notice: Subject to any disclaimer, the term of this patent is extended or adjusted under 35 U.S.C. 154(b) by 144 days.

(21) Appl. No.: 13/903,259

(22) Filed: May 28, 2013

(65) Prior Publication Data

US 2013/0248030 A1     Sep. 26, 2013

Related U.S. Application Data

(63) Continuation of application No. 12/739,063, filed as application No. PCT/GB2008/051030 on Nov. 5, 2008, now abandoned.

(30) Foreign Application Priority Data

Nov. 6, 2007  (GB) .................................. 0721746.6

(51) Int. Cl.
  *F16K 15/03*   (2006.01)
  *E21B 34/06*   (2006.01)
  *E21B 34/10*   (2006.01)

(52) U.S. Cl.
  CPC ................. *E21B 34/06* (2013.01); *E21B 34/10* (2013.01); *F16K 15/03* (2013.01); *Y10T 137/86389* (2015.04)

(58) Field of Classification Search
  CPC ......... E21B 34/06; E21B 34/10; F16K 15/08; Y10T 37/86389
  USPC ..................... 251/215, 229, 298, 301, 251, 62
  See application file for complete search history.

(56) References Cited

U.S. PATENT DOCUMENTS

| 3,144,876 | A  | 8/1964  | Frye         |
|-----------|----|---------|--------------|
| 3,151,839 | A  | 10/1964 | Mott         |
| 3,815,619 | A  | 6/1974  | Ross et al.  |
| 5,044,396 | A  | 9/1991  | Daudet et al.|
| 5,145,005 | A  | 9/1992  | Dollison     |
| 5,323,859 | A  | 6/1994  | Smith et al. |
| 6,328,109 | B1 | 12/2001 | Pringle et al.|
| 6,508,309 | B1 | 1/2003  | French       |

(Continued)

FOREIGN PATENT DOCUMENTS

| EP | 0760418 A2 | 3/1997 |
| GB | 2420133 A  | 5/2006 |

OTHER PUBLICATIONS

Strommen, Henrik, "International Search Report" for PCT/GB2008/051030 as mailed Apr. 7, 2009, (2 pages).

*Primary Examiner* — Marina Tietjen
*Assistant Examiner* — Umashankar Venkatesan
(74) *Attorney, Agent, or Firm* — Winstead PC

(57) ABSTRACT

A valve assembly comprises a conduit having a throughbore and defining a longitudinal axis, a sealing member that is moveable between an open configuration in which the throughbore of the conduit is open, and a sealing configuration in which the sealing member is arranged to substantially obturate the throughbore of the conduit, wherein in the sealing configuration, the sealing member seals the throughbore along a sealing line at least a part of which is angled relative to a direction perpendicular to the axis of the throughbore.

27 Claims, 4 Drawing Sheets

(56) References Cited

U.S. PATENT DOCUMENTS

| | | | |
|---|---|---|---|
| 7,913,714 B2 * | 3/2011 | Arov et al. | 137/456 |
| 8,151,889 B2 | 4/2012 | Biddick | |
| 2006/0011354 A1 | 1/2006 | Logiudice et al. | |
| 2006/0162939 A1 | 7/2006 | Vick et al. | |
| 2008/0035353 A1 | 2/2008 | Hughes et al. | |
| 2009/0229829 A1 | 9/2009 | Lloyd et al. | |
| 2009/0272539 A1 | 11/2009 | Lloyd et al. | |
| 2012/0234558 A1 | 9/2012 | Godfrey et al. | |

* cited by examiner

Section A-A

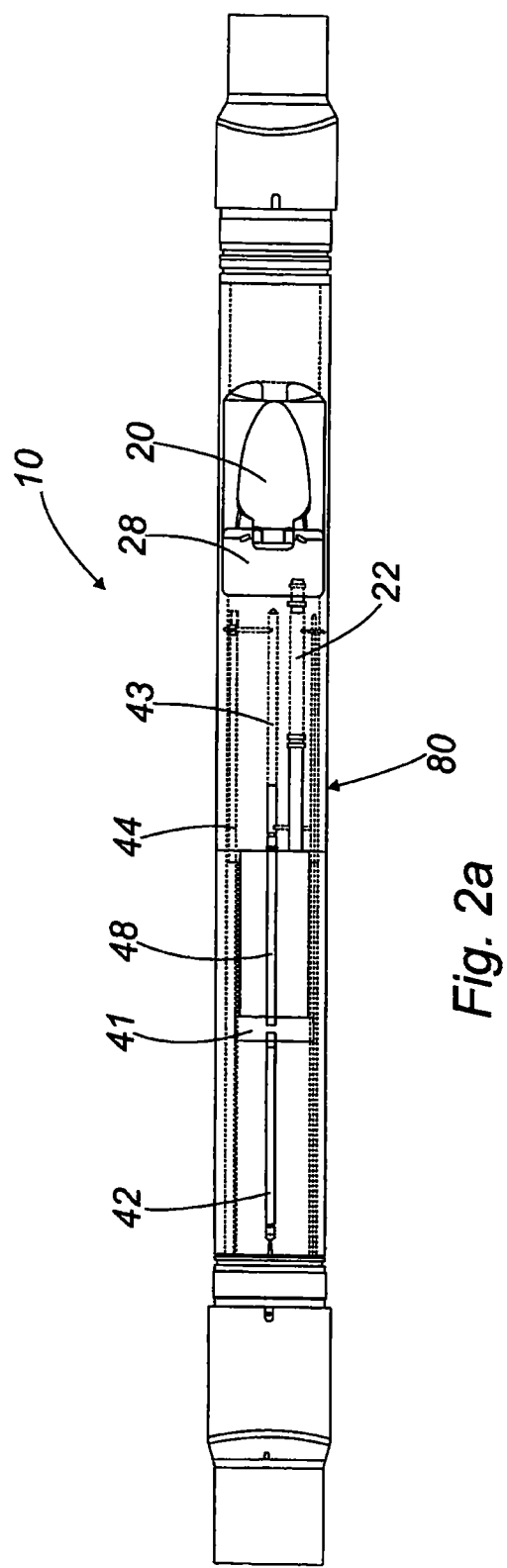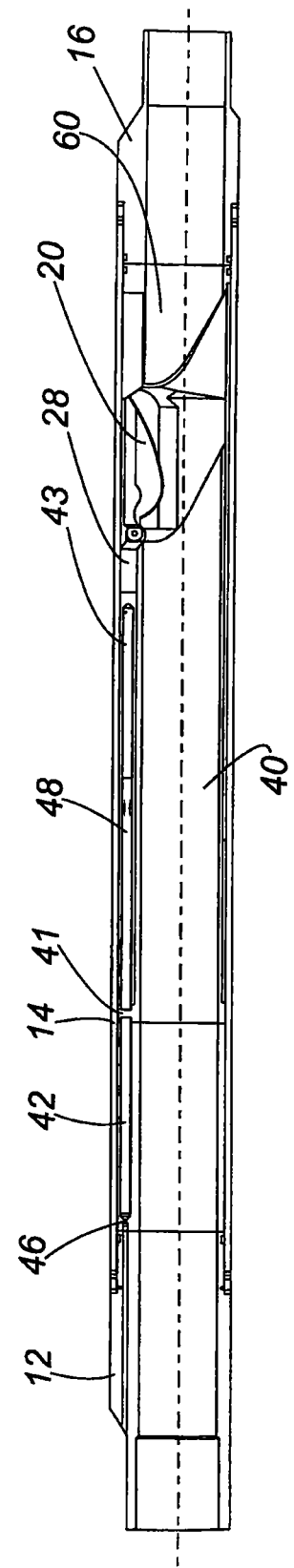
Fig. 2a
Fig. 2b

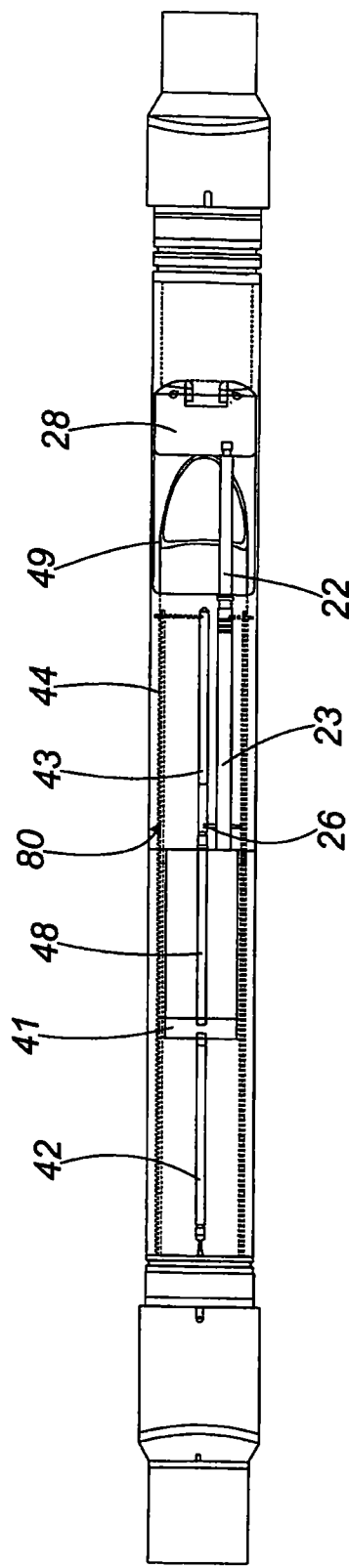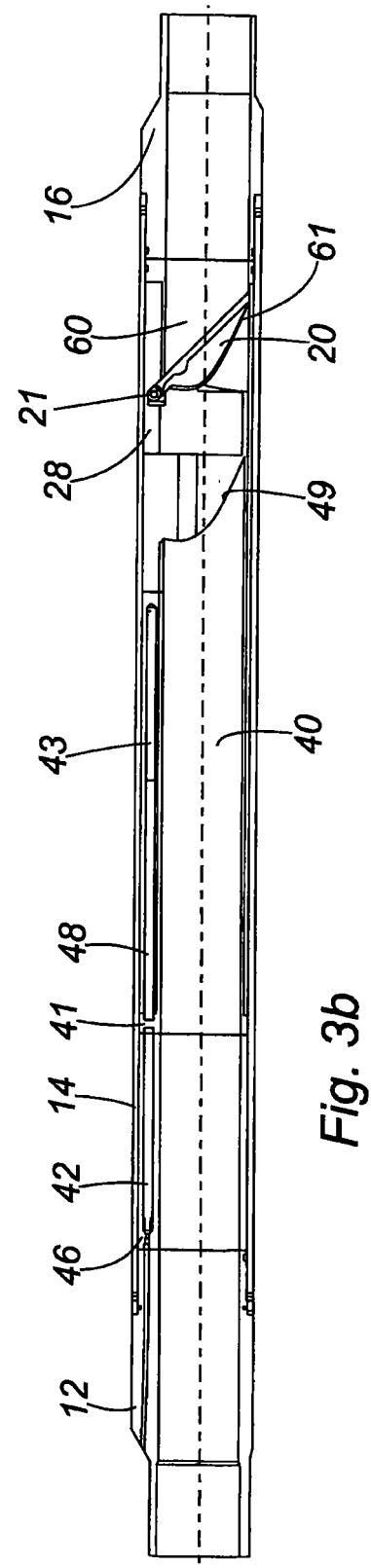
Fig. 3a
Fig. 3b

Section D-D

VALVE ASSEMBLY

This patent application is a continuation of International Patent Application No. PCT/GB2008/051030, filed on Nov. 5, 2008 and nationalized in the United States as U.S. patent application Ser. No. 12/739,063. International Patent Application No. PCT/GB2008/051030 is incorporated by reference in its entirety.

The present invention relates to a valve assembly. In particular, though not exclusively, the invention relates to a flapper valve assembly.

Flapper valves are widely used in fluid conduits that transfer fluids between an oil or gas reservoir and a wellhead. Flapper valves are typically hinged at one side of the conduit and pivotable in an arc 90° about the hinge to move between an open and a closed configuration. In the open configuration, the valve is disposed generally parallel to the longitudinal axis of the throughbore of the conduit and is therefore removed from the throughbore to allow fluids to flow therethrough. In the closed configuration, the valve lies perpendicular to the longitudinal axis of the throughbore to obturate the bore of the conduit. However, conventional flapper valves have the disadvantage that they are unidirectional i.e. they only seal and hold pressure in one direction.

According to a first aspect of the present invention there is provided a valve assembly comprising:
  a conduit having a throughbore and defining a longitudinal axis;
  a sealing member that is moveable between an open configuration in which the throughbore of the conduit is open and a sealing configuration in which the sealing member is arranged to substantially obturate the throughbore of the conduit;
  wherein in the sealing configuration, the sealing member seals the throughbore along a sealing line at least a part of which is angled relative to a direction perpendicular to the longitudinal axis of the throughbore.

The shape of the sealing line can be non-planar.

According to a second aspect of the invention, there is provided a valve assembly comprising:
  a conduit with a throughbore for the passage of fluid therethrough; and
  a sealing member that is both pivotally and axially moveable between an open configuration in which the throughbore of the conduit is open and a sealing configuration in which the sealing member is arranged to substantially obturate the throughbore of the conduit.

According to the second aspect of the invention, the sealing member can seal the throughbore along a sealing line at least a part of which is angled relative to a direction perpendicular to a longitudinal axis of the throughbore.

Preferably, the sealing member is non-circular in plan and preferably is longer than it is wider. The sealing member can be non-planar. More preferably, the sealing member can be arcuate. At least one face of the sealing member can be curved around the longitudinal axis of the throughbore and more preferably a central axis of the sealing member is arranged to be parallel to the longitudinal axis of the throughbore, when in the open configuration. The curve of the at least one face of the sealing member around the longitudinal axis can have a substantially constant radius. A sealing member having such a shape can take up less space and thus improve space efficiency of the apparatus when the sealing member is in the open configuration.

The sealing member can have a convex face and the sealing line can be arranged along the convex face of the sealing member.

The sealing member can be substantially spade, teardrop or egg-shaped in plan view.

An outer edge of the sealing member can be shaped to conform to an inner surface of the conduit.

According to a third aspect of the present invention, there is provided a valve assembly comprising:
  a conduit with a throughbore for the passage of fluid therethrough; and
  a sealing member for selectively opening and sealing the throughbore, wherein the sealing member is substantially spade shaped in plan.

According to the third aspect of the invention, the sealing member can be movable between an open configuration and a sealing configuration.

In the open configuration, the throughbore is open allowing passage of fluids therethrough. In the sealing configuration, the sealing member substantially obturates the throughbore to restrict passage of fluids therethrough.

In the sealing configuration, the valve assembly can retain pressure across the seal in one direction. More preferably, the valve assembly can retain pressure across the seal in both directions.

The sealing member preferably seals the throughbore along a sealing line that is angled relative to a direction perpendicular to an axis of the throughbore.

Typically fluids predominantly flow through the conduit in one direction. The sealing line can be arranged along an upstream face of the sealing member.

According to any aspect of the invention, the sealing member preferably forms part of a sealing mechanism selectively actuable to move the sealing member between the open configuration and the sealing configuration.

The sealing member can be pivotally coupled to the sealing mechanism and more preferably can be pivotally movable within the bore.

The sealing member can be pivotable through less than 90° of rotation to move between the open configuration and the sealing configuration. More preferably, the sealing member is pivotable through less than 70° of rotation to move between the open configuration and the sealing configuration. More preferably, pivotal movement of the sealing member of less than 50° and most preferably around 45° allows the sealing member to move between the open and the sealing configuration.

The sealing mechanism can also be actuable to cause axial movement of the sealing member.

Movement of the sealing member between the open configuration and the sealing configuration is preferably actuated by both axial and pivotal movement of the sealing member.

The sealing member can comprise pivotally attached first and second portions. The first portion can be movable only in an axial direction. The second portion can be movable axially due to its attachment to the first portion as well as pivotally through pivot of the second portion relative to the first portion.

The sealing mechanism can be hydraulically actuable and is preferably coupled to a hydraulic actuation system.

A valve seat can be provided in the throughbore of the conduit. The valve seat can be arranged such that the sealing member seals against the valve seat in the sealing configuration.

The valve seat can be shaped to conform with the profile of the sealing member along the sealing line. The sealing line is preferably the line along which the valve seat and the sealing member are in contact when in the sealing configuration.

Alternatively, the sealing line can be the line along which a seal is made between an inner surface of the conduit and the sealing member.

The valve seat can be moveable between a stowed configuration and a spaced configuration. In the stowed configuration, the sealing member engages the valve seat when the sealing member is in the sealing configuration. In the spaced configuration, the sealing member is spaced from and movable relative to the valve seat.

The valve assembly can further comprise a second valve seat for selective sealing against the sealing member.

At least one of the first and second valve seats can move relative to the sealing member. The sealing member can typically seal against at least one of the valve seats in the sealing configuration. The sealing member can seal against both of the valve seats in the sealing configuration.

The second valve seat can be shaped to guide the sealing member towards the sealing configuration. The second valve seat is preferably shaped to conform with the profile of the sealing member along the sealing line.

The first valve seat can be axially moveable within the bore.

The first valve seat can be mounted on an end face of a sleeve that is slideable within the bore of the conduit.

The sleeve is preferably hydraulically operable. The sleeve can be hydraulically coupled to the hydraulic actuation system also used to open the sealing mechanism.

The hydraulic system of the valve assembly can be actuable by at least one of the following means selected from the group consisting of: a timer; radio frequency signals; a pressure pulse; and electromagnetic induction.

Alternative methods of actuation of the sealing mechanism include applied pressure using control lines and mechanically driven means, such as different types of motor.

The valve assembly is preferably resettable in that it is preferably repeatably moveable between the open and sealing configurations. The valve assembly can comprise a reset system, the actuation of which can cause movement of the valve assembly from the sealing configuration to the open configuration.

Where the valve assembly incorporates a reset system, the reset system can be responsive to at least one of the following means selected from the group consisting of: a timer; a radio frequency signal: a pressure pulse; a mechanical driving means; and electromagnetic induction, for selective movement of the valve assembly into a predetermined configuration.

The valve assembly can be a flapper valve assembly. The sealing member of the valve assembly can be a flapper.

According to a fourth aspect of the invention, there is provided a flapper valve assembly comprising:
  a conduit having a throughbore and a flapper valve; and
  wherein the flapper valve is pivotable through less than 90° to seal the throughbore.

According to a fifth aspect of the invention there is provided a self-cleaning flapper valve assembly.

The self-cleaning flapper valve assembly can comprise: a flapper valve selectively moveable between an open configuration and a sealing configuration; and at least one valve seat against which the flapper valve can seal to substantially seal the throughbore. The flapper valve and the at least one valve seat can be shaped such that movement of the sealing member from the open into the sealing configuration cleans the valve seat.

The self-cleaning action can be achieved by contact between the sealing member and the valve seat as the sealing member is moved into the sealing configuration, since the moving contact between the sealing member and the valve seat can scrape debris from the valve seat.

Optional and essential features of the first, second and third aspects of the invention can also be incorporated with features of the fourth and fifth aspects of the invention where appropriate.

Embodiments of the present invention will now be described, by way of example only, and with reference to the accompanying drawings, in which:

FIG. 1c is an end view of the valve assembly of FIG. 1a;

FIGS. 2a and 2b are, respectively, a partial cutaway plan view and a sectional view of the valve assembly of FIGS. 1a and 1b showing the sealing member exposed in its open configuration;

FIGS. 3a and 3b are, respectively, a partial cutaway plan view and a sectional view of the valve assembly of FIGS. 1a and 1b but showing the sealing member substantially obturating the throughbore;

FIG. 4c is an end view of the valve assembly of FIG. 4a.

Figure 1A:
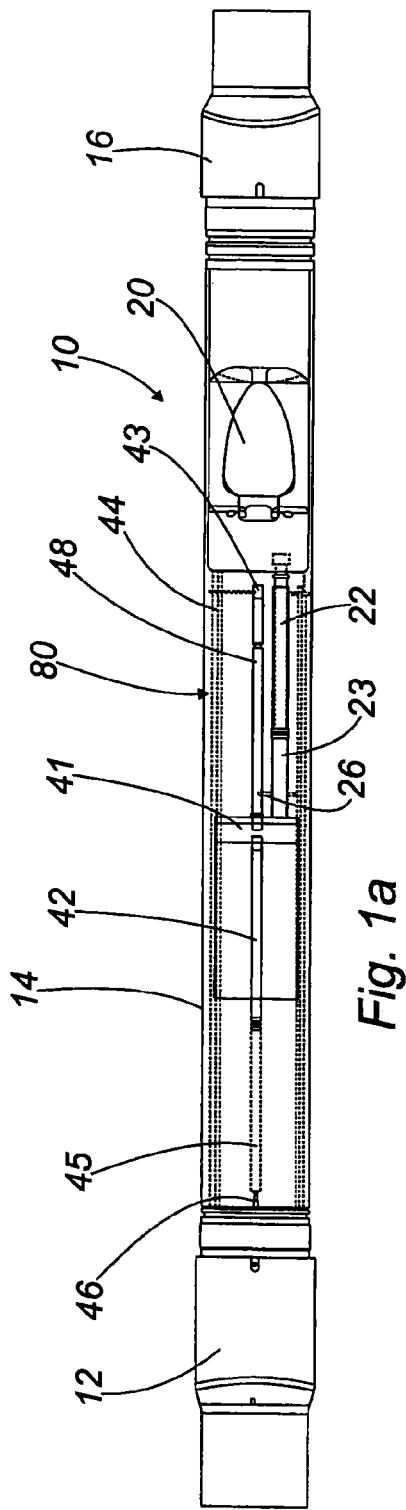
FIGS. 1a and 1b are, respectively, a partial cutaway plan view and a sectional view of a valve assembly in its open configuration.

The valve assembly is shown generally at 10 in the figures and comprises a substantially tubular body having an upper sub 12, a middle sub 14 and a lower sub 16. The subs 12, 14, 16 are connected together by means of conventional threaded pin and box connections and are sealed by O-rings. When connected, the subs 12, 14 and 16 define a central longitudinal axis 18 and a throughbore 19 that acts as a conduit for the flow of fluids through the tubular body. Outer ends of the top sub 12 and the bottom sub 16 have respective end box and pin connections in order to connect the valve assembly 10 to adjacent lengths of tubing to make up the valve assembly 10 as part of a tubing string. In this way, the valve assembly 10 can be incorporated into a production tubing string and run into a downhole wellbore for the recovery of hydrocarbons from hydrocarbon reservoirs.

The middle sub 14 accommodates two flow tubes. An upper flow tube 13 is provided adjacent the top sub 12 so that an inner surface of the top sub 12 and an inner surface of the upper flow tube 13 are substantially contiguous in that they share the same internal diameter. The middle sub 14 also carries a middle flow tube 40 that is dimensioned to be a close sliding fit thereagainst. The middle flow tube 40 has a debris barrier 47 in the form of a Teflon™ ring to restrict debris collection in an annulus between the middle sub 14 and an outer part of the middle flow tube 40.

Figure 1B:
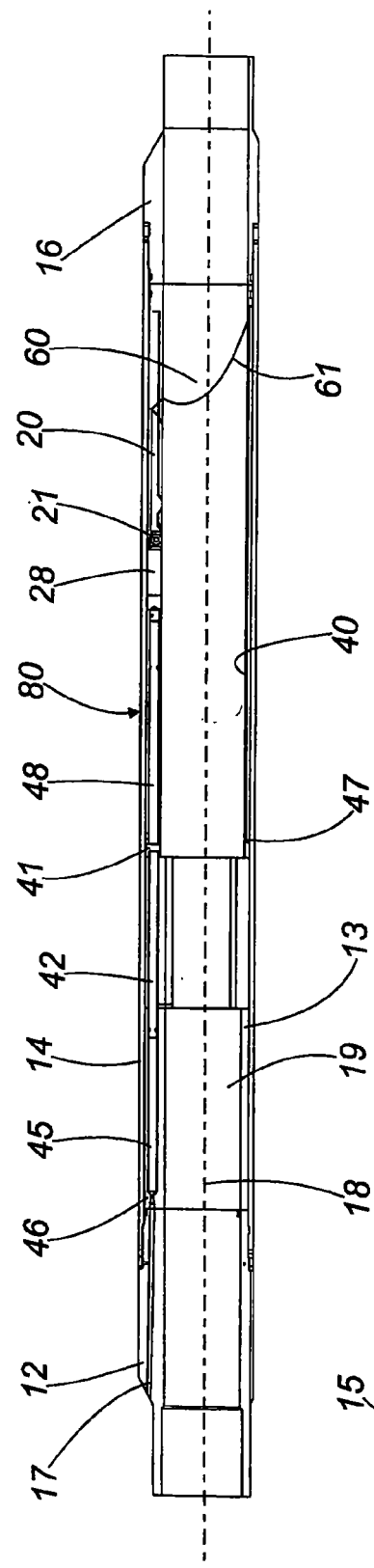
Figure 1C:
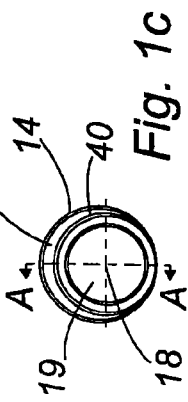

The longitudinal axis 18 of the throughbore 19 is offset relative to a central longitudinal axis of the middle sub 14 as can be seen in FIG. 1c, such that one side of each of the flow tubes 13, 40, abuts the inner surface of the middle sub 14. On the opposing side, the flow tubes 13, 40 have a thicker sidewall to accommodate a hydraulic sealing mechanism shown generally at 80. The end view of FIG. 1c shows that the outer housing of the subs 12, 14, 16 extends radially outwardly relative to the throughbore 19 to a greater extent on one side of the valve assembly 10 than the other. This creates an arcuate pocket 15 in which the hydraulic sealing mechanism 80 is accommodated and in which a sealing member in the form of a flapper valve 20 is housed when in the open configuration.

The sealing mechanism 80 comprises a first piston chamber 45 that lies parallel to the longitudinal axis 18 and is in fluid communication, via a port 46, with a hydraulic line 17 running through a side wall of a top sub 12.

The hydraulic line 17 connects the hydraulic sealing mechanism 80 to an external supply of hydraulic fluid. One end of a piston 42 is sealed within the chamber 45 and the other end of the piston 42 is attached to a protrusion 41 extending radially outwardly from one side of the middle flow tube 40. A second piston 48 is attached to the opposing side of the protrusion 41 so that the pistons 42, 48 and the middle flow tube 40 are rigidly connected and moveable as one unit. The second piston 48 is sealed in a second chamber 43 that is in fluid communication with a hydraulic fluid line 44 that also leads to an external supply of hydraulic fluid.

A hydraulic actuation system (not shown) produces two controlled outputs, one of which is arranged to supply the fluid line 17 and the other is arranged to supply the fluid line 44. Signalling mechanisms can be used to actuate the hydraulic system. These signalling mechanisms can include RFID tags (such as disclosed in UK Patent No GB2420133) to initiate pre-programmed activities, or hydraulic control lines that extend from surface. Pressure pulses in the bore could also be used to actuate the hydraulic system.

A third piston 22 is sealed within a third chamber 23 arranged substantially parallel to the second chamber 43. The second piston chamber 43 has a hydraulic connecting line 26 allowing selective fluid communication between the second piston chamber 43 and the third chamber 23, but only when the second piston 48 uncovers the hydraulic connecting line 26. The third piston 22 is rigidly attached to a collar 28 that carries the flapper valve 20. As will be appreciated by those skilled in the art, although the flapper valve 20 is intended for operation in the circular cross-section throughbore 19, the flapper valve 20 itself is not circular in plan view but rather is longer than it is wider. Moreover, the flapper valve 20 in a plan view (FIG. 1a) is substantially spade, egg- or teardrop shaped. The flapper valve 20 as shown in FIG. 2b has a central axis along its length that is straight and parallel to the longitudinal axis of the throughbore when the valve 20 is in the open configuration and has arcuate sides at each side of the central axis that curve to follow a similar radius of curvature as the lower end of the middle flow tube 40. The flapper valve 20 is pivotally coupled to the collar 28 via a hinge 21 acting as a pivot point. Therefore, the flapper valve 20 is moveable both axially by the movement of the piston 22 attached to the collar 28 and pivotally via the hinge 21.

The bottom sub 16 has a lower flow tube 60 positioned adjacent thereto such that an inner surface of the bottom sub 16 is contiguous within an inner surface of the lower flow tube 60. The lower flow tube 60 has a shaped sealing seat 61 that is arranged to guide the flapper valve 20 into a sealing configuration, on axial movement of the collar 28, and allow the flapper valve 20 to seal thereagainst. The sealing seat 61 of the lower flow tube 60 is shaped to match and seal against a rear face of the flapper valve 20.

Figure 4A:
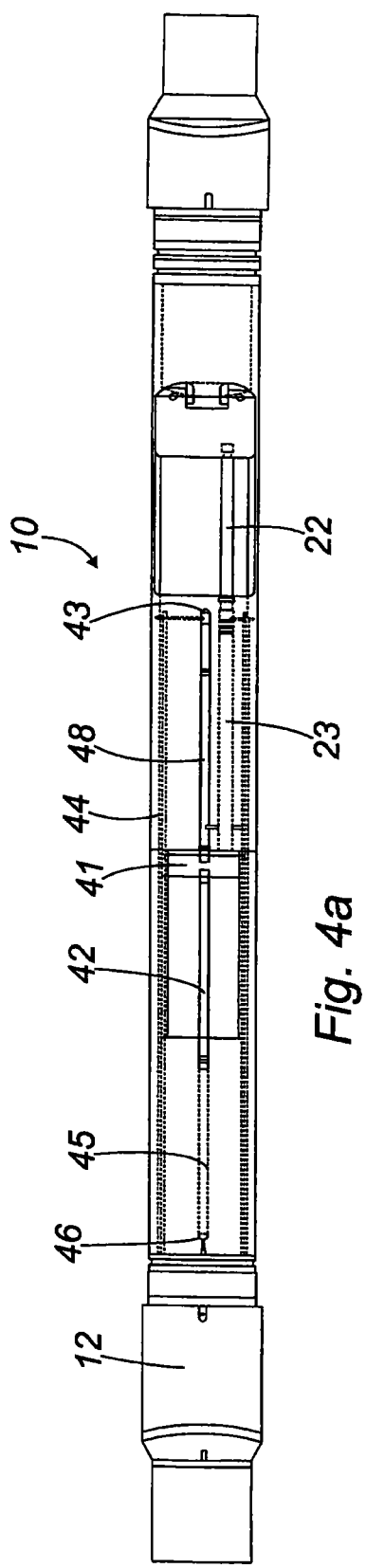
FIGS. 4a and 4b are, respectively, a partial cutaway plan view and a sectional view of the assembly of FIGS. 3a and 3b in its sealing configuration.
Figure 4B:
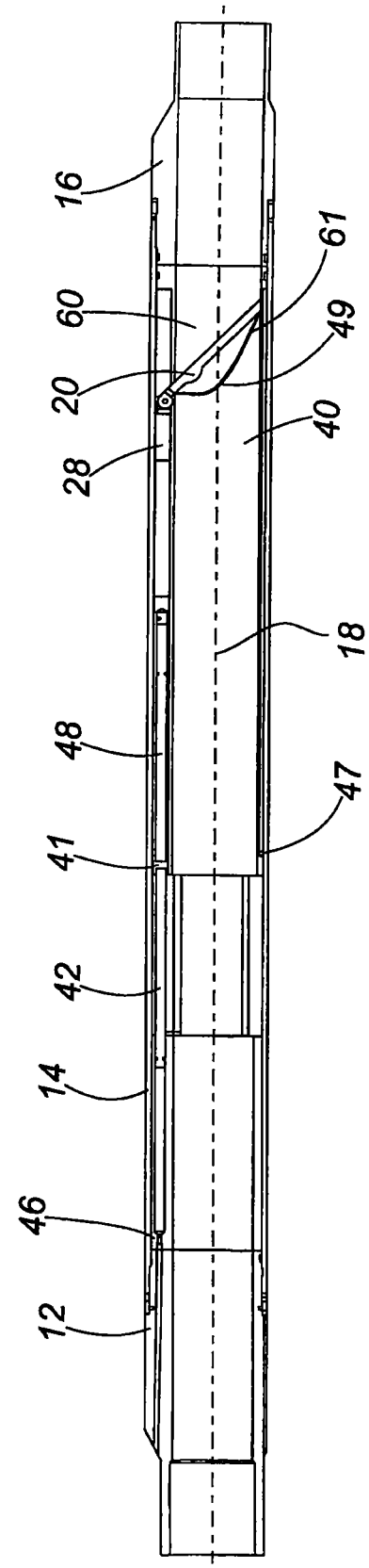
Figure 4C:
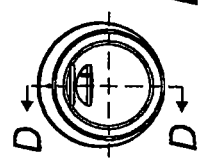

The outer diameter of the middle flow tube 40 is a sliding fit within the middle sub 14 and the middle flow tube 40 is slideable between the end of the upper flow tube 13 and the flapper valve 20 in the throughbore 19 in a sealing configuration or the sealing seat 61 of the lower flow tube 60 in an open configuration. A contact edge 49 (FIG. 3a) of the middle flow tube 40 is shaped to match and abut a leading edge of the flapper valve 20. The flapper valve 20 is movable between an open configuration in which the throughbore 19 of the valve assembly 10 is open (shown in FIGS. 1a-c) and a sealing configuration in which the throughbore 19 of the valve assembly 10 is closed and fluid passage therethrough is restricted (shown in FIGS. 4a-c).

Prior to use of the valve assembly 10, the ends of the valve assembly 10 are connected to lengths of pipe in a tubing string that is run downhole. The valve assembly 10 is run downhole with the flapper valve 20 in the open configuration as shown in FIGS. 1a-c. The flapper valve 20 is accommodated within the arcuate pocket 15 and retained in this configuration by the middle flow tube 40 that prevents the flapper valve 20 from pivoting into the throughbore 19. The contact face 49 of the middle flow tube 40 abuts the sealing seat 61 of the lower flow tube 60 in order that the throughbore 19 of the valve assembly 10 remains open and fluids can flow therethrough.

It is often required to set a packer or to pressure test the tubing string prior to commencement of other operations. The flapper valve 20 of the valve assembly 10 can be used to seal or block the throughbore 19 and thereby provide a pressure retaining barrier to conduct these operations. In such a requirement, an operator sends a command to the hydraulic system, which supplies fluid through the hydraulic line 44 that is in fluid communication with the second chamber 43. As fluid collects in the second chamber 43, the second piston 48 is moved axially in a direction away from the flapper valve 20. Since the second piston 48 is rigidly connected to the middle flow tube 40 and the first piston 42 via the collar 41, the middle flow tube 40 and first piston 42 are also moved towards the top sub 12. As the first piston 42 enters the first chamber 45, fluid is forced out of the port 46 and through the hydraulic fluid line 17, where it is returned to the hydraulic system. Axial movement of the middle flow tube 40 continues until the upper end of the middle flow tube 40 abuts the lower end of the upper flow tube 13 as shown in FIGS. 2a and 2b.

Once the second piston 48 has moved beyond the connecting line 26 between the second chamber 43 and the third chamber 23, the connecting line 26 is uncovered to allow fluid communication between the second chamber 23 and the third chamber 43. As a result, hydraulic fluid enters the third chamber 23. Fluid in the third chamber 23 forces the third piston 22 to move towards the bottom sub 16. Since the collar 28 and the flapper valve 20 are connected to the third piston 22, axial movement of the third piston 22 causes a corresponding movement of the collar 28 and flapper valve 20. The absence of the middle flow tube 40 allows the flapper valve 20 to pivot about the hinge 21 through 45° into the throughbore 19. The flapper valve 20 is guided into position by the sealing seat 61 of the lower flow tube 60 as shown in FIGS. 3a and 3b. As the flapper valve 20 travels into the sealing configuration, the valve 20 is pushed along the sealing seat 61 of the flow tube 60 thereby scraping debris from the seat 61. This self-cleaning action as the flapper valve 20 moves into position over the sealing seat 61 results in an improved seal between the valve 20 and the seat 61. In the sealing configuration, a convex face of the flapper valve 20 makes a seal against the sealing seat 61. This seal is made against a side of the flapper valve 20 that is typically in the upstream position (in other words the convex face of the flapper valve 20 faces downwards or away from the surface of the well). The line along which the seal is made is inclined approximately at an angle of 45° relative to the longitudinal axis 18 of the tubular.

Once the second piston 42 has reached its full extent of travel, the second piston 42 contacts a switch (not shown) positioned adjacent the port 46. The switch sends a command to the hydraulic system to return the middle flow tube 40 to its original position. The hydraulic system then supplies fluid via the hydraulic line 12 and through the port 46 into the first chamber 45. The hydraulic fluid urges the first piston 42 towards the flapper valve 20. This causes movement of protrusion 41 and hence the second piston 48 and the middle flow tube 40 towards flapper valve 20. Movement of the second piston forces fluid from the second piston chamber 43 and into the line 44 which returns the fluid to the hydraulic fluid system. Axial movement of the middle flow tube 40 continues until the contact edge 49 abuts the leading face of the flapper valve 20.

The throughbore 19 is now obturated by the presence of the flapper valve 20. The valve seat in the form of the sealing seat, 61 and the contact edge 49 arranged to abut the flapper valve 20 ensures that the flapper valve 20 is positively held in this position and is thus prevented from moving any further past 45° or from being unintentionally retracted. The flapper valve 20 can thus retain pressure in both directions.

The flapper valve 20 and middle flow tube 40 can be resettable downhole. The valve assembly 10 can be programmed to cause selective movement of the flapper valve 20 and middle flow tube 40 to a predetermined reset configuration. Thus, the barrier can be removed to permit two-way flow once the testing or packer setting operations have been completed. This can be achieved by actuation of the hydraulic system in reverse to perform the steps of withdrawing the middle flow tube 40 and subsequently returning the flapper valve 20 in the direction of the top sub 12, followed by moving the middle flow tube 40 to its original position against the sealing seat 61 of the lower flow tube 60.

In the arrangement shown in FIGS. 1*a*-*c* and 4*a*-*c*, the first piston 42 is uncovered when the contact face 49 of the middle flow tube 40 abuts the sealing seat 61 of the lower flow tube 60. According to an alternative embodiment, a thin walled flow tube could be provided to bridge this gap and substantially restrict debris from collecting in the region of the first piston 42.

Embodiments of the present invention can seal the throughbore 19 without requiring the flapper valve 20 to be rotated all the way through 90° and can seal the throughbore by being rotated substantially less than 90° which affords such a flapper valve 20 with the advantage that the flapper valve 20 can be more easily moved from the sealing configuration to the open configuration because it is less likely to be jammed by debris resting on it from above.

Although the above embodiment describes that a seal is achieved by sealing the rear face of the flapper valve 20 against the sealing seat 61, the leading face of the flapper valve 20 could alternatively or additionally seal against the contact face 49 of the middle flow tube 40. The seals between the flapper valve 20 and the flow tubes 40, 60 can be carried on the sealing seat 61 or contact edge 49 of the flow tubes 40, 60 or on the flapper valve 20. The seals can be provided by metal-to-metal contact between the sealing seat 61 and the flapper valve 20 or rubber seals can be provided in the region of contact between the flapper valve 20 and the sealing seat 61.

Modifications and improvements can be incorporated without departing from the scope of the invention. For example, the sealing line can be planar and the sealing member can be elliptical in shape and arranged to make a planar seal along the sealing line, although the flapper valve 20 shown in FIGS. 1 to 4 is the preferred shape because the arcuate flapper valve 20 is more space efficient.

The invention claimed is:

1. A valve assembly comprising:
   a conduit having a throughbore and defining a longitudinal axis;
   at least one valve seat provided in the throughbore of the conduit;
   a sealing member that is moveable relative to the at least one valve seat between an open configuration in which the throughbore of the conduit is open and a sealing configuration in which the sealing member is arranged to substantially obturate the throughbore of the conduit;
   wherein in the sealing configuration, the sealing member seals against the at least one valve seat to seal the throughbore along a sealing line at least a part of which is elliptical and angled at a non-zero angle relative to a direction perpendicular to the longitudinal axis of the throughbore;
   wherein the sealing member is both pivotally and axially movable relative to the at least one valve seat between the open configuration and the sealing configuration; and
   wherein the valve assembly includes a sealing mechanism which is selectively actuable to move the sealing member independent of fluid flow, both axially and pivotally relative to the at least valve seat between the open configuration and the sealing configuration.

2. A valve assembly as claimed in claim 1, wherein the shape of the sealing line is non-planar.

3. A valve assembly as claimed in claim 1, wherein at least one face of the sealing member is curved around the longitudinal axis of the throughbore when in the open configuration.

4. A valve assembly as claimed in claim 3, wherein the curve of the at least one face of the sealing member around the longitudinal axis comprises a substantially constant radius.

5. A valve assembly as claimed in claim 1, wherein the sealing member comprises a convex face and the sealing line is arranged along the convex face of the sealing member.

6. A valve assembly as claimed in claim 1, wherein an outer edge of the sealing member is shaped to conform to an inner surface of the conduit.

7. A valve assembly as claimed in claim 1, wherein the sealing member is substantially spade shaped in plan.

8. A valve assembly as claimed in claim 1, wherein in the sealing configuration, the sealing member substantially obturates the throughbore to restrict passage of fluids therethrough and retains pressure across the seal in at least one direction.

9. A valve assembly as claimed in claim 8, wherein the valve assembly retains pressure across the seal in both directions.

10. A valve assembly as claimed in claim 1, wherein the sealing line is arranged along an upstream face of the sealing member.

11. A valve assembly as claimed in claim 1, wherein the sealing member comprises part of a sealing mechanism selectively actuable to move the sealing member between the open configuration and the sealing configuration.

12. A valve assembly as claimed in claim 11, wherein the sealing member is pivotally coupled to the sealing mechanism and is pivotally movable within the bore.

13. A valve assembly as claimed in claim 12, wherein the sealing member is pivotable through less than 90° of rotation to move between the open configuration and the sealing configuration.

14. A valve assembly as claimed in claim 13, wherein the sealing member is pivotable through 45° of rotation to move between the open configuration and the sealing configuration.

15. A valve assembly as claimed in claim 12, wherein the sealing mechanism is actuable to cause axial movement of the sealing member.

16. A valve assembly as claimed in claim 12, wherein the sealing member comprises pivotally attached first and second portions and the first portion is movable only in an axial direction, wherein the second portion is movable axially due to its attachment to the first portion as well as pivotally through pivot of the second portion relative to the first portion.

17. A valve assembly as claimed in claim 1, wherein the valve assembly further comprises a second valve seat for selective sealing against the sealing member.

18. A valve assembly as claimed in claim 17, wherein at least one of the first and second valve seats moves relative to the sealing member.

19. A valve assembly as claimed in claim 17, wherein the second valve seat is shaped to guide the sealing member towards the sealing configuration.

20. A valve assembly as claimed in claim 1, wherein the at least one valve seat is mounted on an end face of a sleeve that is axially moveable within the bore of the conduit.

21. A valve assembly as claimed in claim 1, wherein the valve assembly is resettable in that it is repeatably moveable between the open and sealing configurations.

22. A valve assembly as claimed in claim 21, wherein the valve assembly comprises a reset system, the actuation of which can cause movement of the valve assembly from the sealing configuration to the open configuration.

23. A valve assembly as claimed in claim 22, wherein the reset system is responsive to at least one of the following means selected from the group consisting of:
   a timer;
   a radio frequency signal: a pressure pulse;
   a mechanical driving means; and
   electromagnetic induction, for selective movement of the valve assembly into a predetermined configuration.

24. A self-cleaning flapper valve assembly as claimed in claim 1, wherein the flapper valve assembly and at least one valve seat is shaped such that movement of the sealing member from the open into the sealing configuration cleans the valve seat.

25. A self-cleaning flapper valve assembly as claimed in claim 24, wherein the self-cleaning action is achieved by contact between the sealing member and the valve seat as the sealing member is moved into the sealing configuration, since the moving contact between the sealing member and the valve seat can scrape debris from the valve seat.

26. A valve assembly comprising:
   a conduit having a throughbore and defining a longitudinal axis;
   at least one valve seat provided in the throughbore of the conduit;
   a sealing member that is moveable relative to the at least one valve seat between an open configuration in which the throughbore of the conduit is open and a sealing configuration in which the sealing member is arranged to substantially obturate the throughbore of the conduit; and
   wherein in the sealing configuration, the sealing member seals against the at least one valve seat to seal the throughbore along a sealing line at least a part of which is angled at a non-zero angle relative to a direction perpendicular to the longitudinal axis of the throughbore; and
   wherein the sealing member moves independent of fluid flow, both pivotally and axially along the valve seat between the open configuration and the sealing configuration thereby scraping debris from the valve seat before the valve assembly reaches the sealing configuration.

27. A valve assembly comprising:
   a conduit having a throughbore and defining a longitudinal axis;
   at least one valve seat provided in the throughbore of the conduit;
   a sealing member that is moveable relative to the at least one valve seat between an open configuration in which the throughbore of the conduit is open and a sealing configuration in which the sealing member is arranged to substantially obturate the throughbore of the conduit; and
   wherein in the sealing configuration, the sealing member seals against the at least one valve seat to seal the throughbore along a sealing line at least a part of which is angled at a non-zero angle relative to a direction perpendicular to the longitudinal axis of the throughbore; and
   wherein the sealing member is both pivotally and axially movable, independent of fluid flow, relative to the valve seat between the open configuration and the sealing configuration, and wherein at least one face of the sealing member is curved around the longitudinal axis of the throughbore when in the open configuration.

* * * * *